United States Patent
Yokoyama et al.

(10) Patent No.: US 7,830,932 B2
(45) Date of Patent: Nov. 9, 2010

(54) INTERNAL RESONATOR TYPE SHG LIGHT SOURCE

(75) Inventors: Toshifumi Yokoyama, Osaka (JP); Kiminori Mizuuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 120 days.

(21) Appl. No.: 12/438,930

(22) PCT Filed: Oct. 19, 2007

(86) PCT No.: PCT/JP2007/070447

§ 371 (c)(1), (2), (4) Date: Feb. 25, 2009

(87) PCT Pub. No.: WO2008/050685

PCT Pub. Date: May 2, 2008

(65) Prior Publication Data
US 2010/0008388 A1    Jan. 14, 2010

(30) Foreign Application Priority Data
Oct. 24, 2006    (JP) .............................. 2006-288578

(51) Int. Cl.
H01S 3/00    (2006.01)
(52) U.S. Cl. .......................................... 372/33; 372/32
(58) Field of Classification Search .............. 372/38.02, 372/50.12, 99
See application file for complete search history.

(56) References Cited
U.S. PATENT DOCUMENTS
5,459,744 A    10/1995    Hayashi

| | | | |
|---|---|---|---|
| 6,018,536 A * | 1/2000 | Alphonse | 372/23 |
| 6,490,309 B1 * | 12/2002 | Okazaki et al. | 372/75 |
| 6,996,140 B2 * | 2/2006 | Waarts et al. | 372/21 |
| 7,742,221 B2 * | 6/2010 | Mizuuchi et al. | 359/328 |
| 7,769,060 B1 * | 8/2010 | Furuya et al. | 372/21 |

FOREIGN PATENT DOCUMENTS

| | | |
|---|---|---|
| JP | 64-55883 | 3/1989 |
| JP | 7-181534 | 7/1995 |
| JP | 11-121850 | 4/1999 |
| JP | 2003-174222 | 6/2003 |

OTHER PUBLICATIONS

International Search Report issued Nov. 13, 2007 in the International (PCT) Application No. PCT/JP2007/070447.

* cited by examiner

Primary Examiner—Minsun Harvey
Assistant Examiner—Tuan N. Nguyen
(74) Attorney, Agent, or Firm—Wenderoth, Lind & Ponack, L.L.P.

(57) ABSTRACT

An internal resonator type SHG light source includes a pump light source which emits a pump light; a solid-state laser which absorbs the pump light and which emits a fundamental wave; an output mirror provided so as to face the solid-state laser, which forms a resonator together with the solid-state laser; a wavelength conversion element provided in the resonator, which converts the fundamental wave into a harmonic wave; a detector which detects a temperature of the wavelength conversion element; and a rotating unit which changes an incident angle of the fundamental wave on the wavelength conversion element by rotating the wavelength conversion element, wherein the rotating unit rotates the wavelength conversion element according to the temperature of the wavelength conversion element as detected by the detector.

5 Claims, 9 Drawing Sheets

INTERNAL RESONATOR TYPE SHG LIGHT SOURCE

FIELD OF TECHNOLOGY

The present invention relates to an internal resonator type SHG light source for generating a fundamental wave by inputting pump light from a pump light source to a solid-state laser and wavelength converting the fundamental wave into a second harmonic using a wavelength conversion element disposed in a resonator.

DESCRIPTION OF THE BACKGROUND ART

An internal resonator type SHG light source has been widely used for its beneficial features of high electro-optic conversion efficiency, low power consumption, and producing green laser light, which is very difficult to be produced as a laser light from a semiconductor laser.

FIG. 9 shows a schematic structure of an internal resonator type SHG light source 100 shown in patent document 1 as a conventional example of this type of the SHG light source. In the conventional SHG light source, a pump light 117 emitted from a semiconductor laser 101 is focused on a solid-state laser 103 by a lens 102. A fundamental wave 118 excited by the pump light is emitted from the solid-state laser 103 and the fundamental wave 118 resonates in a resonator formed by a reflecting surface formed on the solid-state laser 103 and a reflecting surface of an output mirror 106, thereby generating laser oscillation. In the resonator, a quasi phase matching wavelength conversion element 104 is provided to wavelength convert the fundamental wave 118 into a second harmonic 119. Furthermore, an etalon 105 is provided in the resonator to reduce the noise of the resonator. The semiconductor laser 101 and the quasi phase matching wavelength conversion element 104 are respectively temperature controlled by holders 107, 108, Peltier elements 109, 110 and a temperature controller 115. An output of the second harmonic 119 has a part thereof branched off by a splitter 111 to be monitored by a detector 112, and the output stabilization of the second harmonic 119 is realized by a comparator 113 and a drive controller 114.

In patent document 1, the quasi phase matching wavelength conversion element 104 is rotated using a helical coil 116 to compensate for a manufacturing variation of a polarization reversal region formed in the quasi phase matching wavelength conversion element 104 for phase matching.

However, in the conventional internal resonator type SHG light source, the output of the light source is stabilized using a plurality of Peltier elements as described above. The use of such Peltier elements; however, causes problems including an increase in power consumption, higher cost, heat generation of the Peltier elements and the enlargement of a light source device by the Peltier elements. These problems are serious in the applications of the consumer products.

Patent Document 1:
Japanese Unexamined Patent Publication No. 2003-174222.

DISCLOSURE OF THE INVENTION

An object of the present invention is to provide an internal resonator type SHG light source capable of realizing low power consumption, low cost and miniaturization of a device by eliminating the need to temperature control a wavelength conversion element.

An internal resonator type SHG light source according to one aspect of the present invention includes a pump light source which emits a pump light; a solid-state laser which absorbs the pump light and which emits a fundamental wave; an output mirror provided so as to face the solid-state laser, which forms a resonator together with the solid-state laser; a wavelength conversion element provided in the resonator, which converts the fundamental wave into a harmonic wave; a detector which detects a temperature of the wavelength conversion element; and a rotating unit which changes an incident angle of the fundamental wave on the wavelength conversion element by rotating the wavelength conversion element, wherein the rotating unit rotates the wavelength conversion element according to the temperature of the wavelength conversion element as detected by the detector.

According to the foregoing structure of the internal resonator type SHG light source, an incident angle of the fundamental wave on the wavelength conversion element is changed by rotating the wavelength conversion element according to the temperature of the wavelength conversion element. With this structure, it is possible to reduce variations in phase matching conditions resulting from a change in temperature of the wavelength conversion element by rotating the wavelength conversion element. It is therefore possible to eliminate the need of controlling the temperature of the wavelength conversion element, and to realize a light source of low power consumption, low cost and smaller size.

With the foregoing structure, an internal resonator type SHG light source, which does not require a temperature control by Peltier element(s), can be realized, thereby realizing a light source of low power consumption, low cost and smaller size.

BEST MODES FOR EMBODYING THE INVENTION

Figure 1:
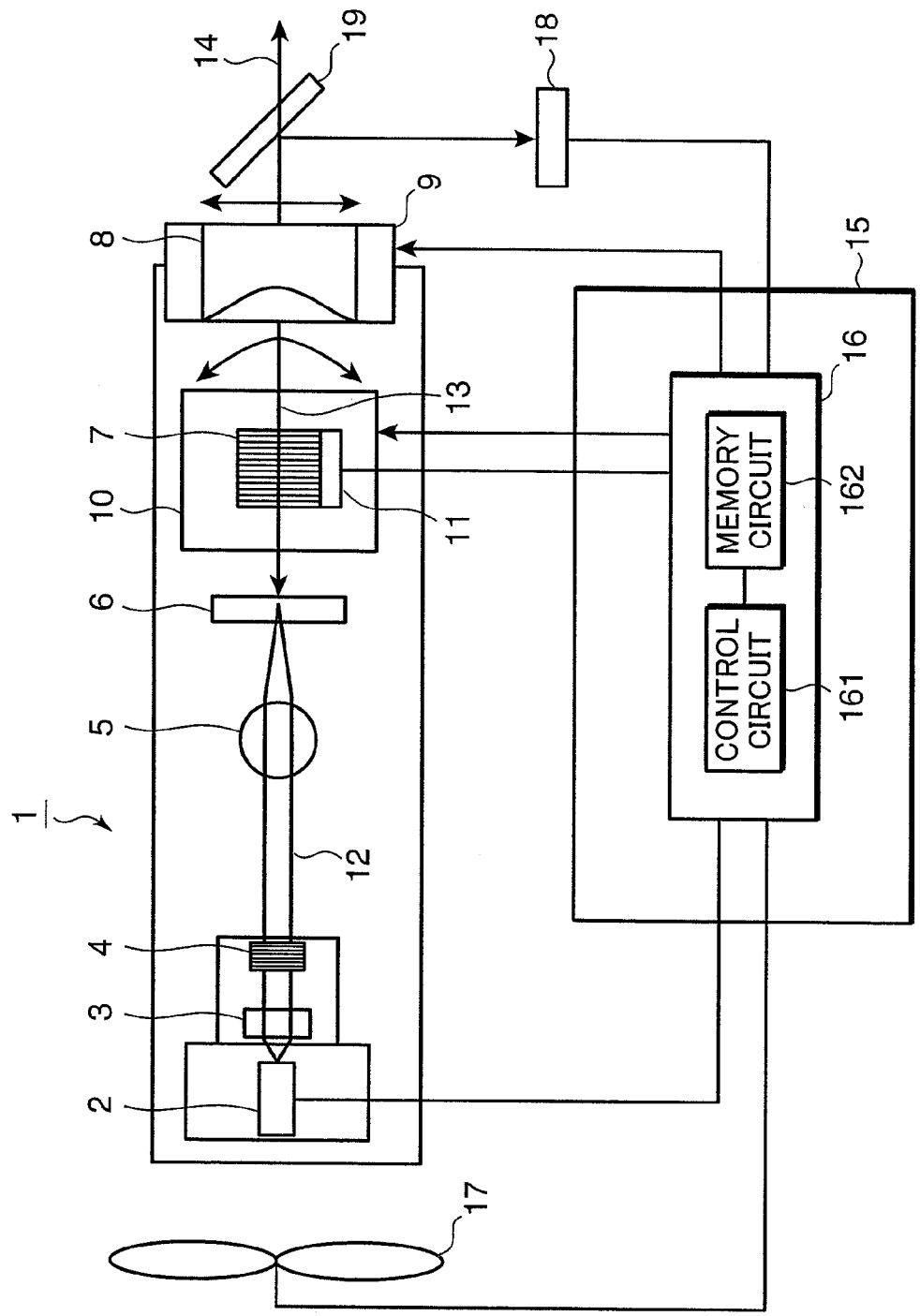
FIG. 1 is a schematic diagram showing the structure of an internal resonator type SHG light source according to the first embodiment of the present invention.

Hereinafter, embodiments of the present invention are described with reference to the drawings. In the following description with reference to the drawings, same or similar elements are identified by same or similar reference numerals and may not be repeatedly described in some cases.

First Embodiment

The first embodiment of the present invention relates to an internal resonator type SHG light source which eliminates the need of controlling a temperature of a wavelength conversion element by a temperature controlling device such as a Peltier element by adjusting a phase matching wavelength of the wavelength conversion element according to a change in temperature of the wavelength conversion element. FIG. 1 is a schematic diagram showing the structure of the internal resonator type SHG light source according to the first embodiment of the present invention.

An internal resonator type SHG laser 1 according to the present embodiment is, as shown in FIG. 1, provided with a pump semiconductor laser 2 for emitting light having a wavelength near 808 nm, a rod lens 3, a VBG (Volume Bragg Grating) 4, a ball lens 5, a solid-state laser 6, a wavelength conversion element 7, a concave mirror 8 as an output mirror, a concave mirror moving mechanism 9, a wavelength conversion element rotating mechanism 10 and a wavelength conversion element temperature detector 11. A driving device 15 is connected to the internal resonator type SHG light source 1 according to the present embodiment, and an integrated circuit 16 is incorporated into the driving device 15. Heat radiation of the internal resonator type SHG light source 1 according to the present embodiment is performed by a fan 17. By using the fan 17, it is possible to significantly reduce the power consumption as compared with the case where a Peltier element is used.

The internal resonator type SHG light source 1 according to the present embodiment is driven by the driving device 15 and outputs a second harmonic 14. Particularly, operations including the application of a drive current to the pump semiconductor laser 2, the temperature detection of the wavelength conversion element 7 by the wavelength conversion element temperature detector 11, the rotation of the wavelength conversion element 7 by the wavelength conversion element rotating mechanism 10, the movement of the concave mirror 8 by the concave mirror moving mechanism 9, the driving of the fan 17 and the output detection of the second harmonic 14 by a light receiving element 18 are controlled and managed by the integrated circuit 16 in the driving device 15. A control circuit 161 and a memory circuit 162 are provided in the integrated circuit 16, wherein the control circuit 161 is, for example, a CPU for performing various arithmetic processings and the memory circuit 162 is, for example, a readable and writable nonvolatile memory. The control circuit 161 controls the above respective operations using data stored in the memory circuit 162 beforehand and data successively saved during the operation of the light source. Although the above respective operations are controlled by the same control circuit 161 in the present embodiment, it is, of course, all right, for example, to prepare different control circuits for the above respective operations.

In the present embodiment, pump light 12 having a wavelength near 808 nm and emitted from the pump semiconductor laser 2 has vertical direction (perpendicular to the plane of FIG. 1) components thereof collimated by the rod lens 3 to be incident on the VBG 4. The VBG 4 is a transmissive diffraction grating, and a part of the pump light 12 incident on the VBG 4 is reflected and fed back to the pump semiconductor laser 2, whereby an oscillation wavelength of the pump semiconductor laser 2 is locked to a wavelength (808 nm) selected by the VBG 4.

In the present embodiment, an amount of a return light from the VBG 4 to the pump semiconductor laser 2 is set to 20% of the pump light 12 incident on the VBG 4. The amount of the return light from the VBG 4 is appropriately about 10% to 30%. Wavelength locking weakens if the return light quantity is equal to or below 10%. Further, if the return light quantity is equal to or above 30%, this leads to not only a reduction in an amount of transmitted light, but also an increased possibility of causing an unstable operation due to an increase in amount of light in the pump semiconductor laser 2. Even when a change in temperature occurs due to the use of the VBG 4, the oscillation wavelength of the pump semiconductor laser 2 hardly changes. As a result, a high-precision temperature controller for the pump semiconductor laser 2 is not necessary and heat radiation is realized by the inexpensive fan 17.

Since the solid-state laser 6 has high absorption efficiency near 808 nm, it is of considerable significance that the wavelength of the pump semiconductor laser 2 does not change. Although the VBG 4 is used to lock the oscillation wavelength of the pump semiconductor laser 2 as described above in the present embodiment, similar effects can be obtained even if a band-pass filter produced using a dielectric multilayer film is used. Similar effects can also be obtained when the pump semiconductor laser 2 is a DFB laser or a DBR laser provided with a wavelength locking function.

The pump light 12 wavelength locked by the VBG 4 is focused on the solid-state laser 6 by the ball lens 5. $YVO_4$ doped with 3% of Nd is used as the solid-state laser 6. The solid-state laser 6 is excited by the pump light 12 to generate a fundamental wave 13 having a wavelength of 1064 nm. The fundamental wave 13 resonates in a resonator formed by the solid-state laser 6 and the concave mirror 8. A part of the fundamental wave 13 is wavelength converted by the wavelength conversion element 7 disposed in the resonator and outputted to the outside as the second harmonic 14 having a wavelength of 532 nm. In the present embodiment, a quasi phase matching wavelength conversion element formed with a periodic polarization reversal region in Mg-doped $LiNbO_3$ (hereinafter, "Mg:$LiNbO_3$") is used as the wavelength conversion element 7. The length of the wavelength conversion element 7 is 0.8 mm. Mg:$LiNbO_3$ is a material with high conversion efficiency from the fundamental wave 13 into the second harmonic 14 and has an advantage of being able to shorten the length of the wavelength conversion element 7.

Figure 2:
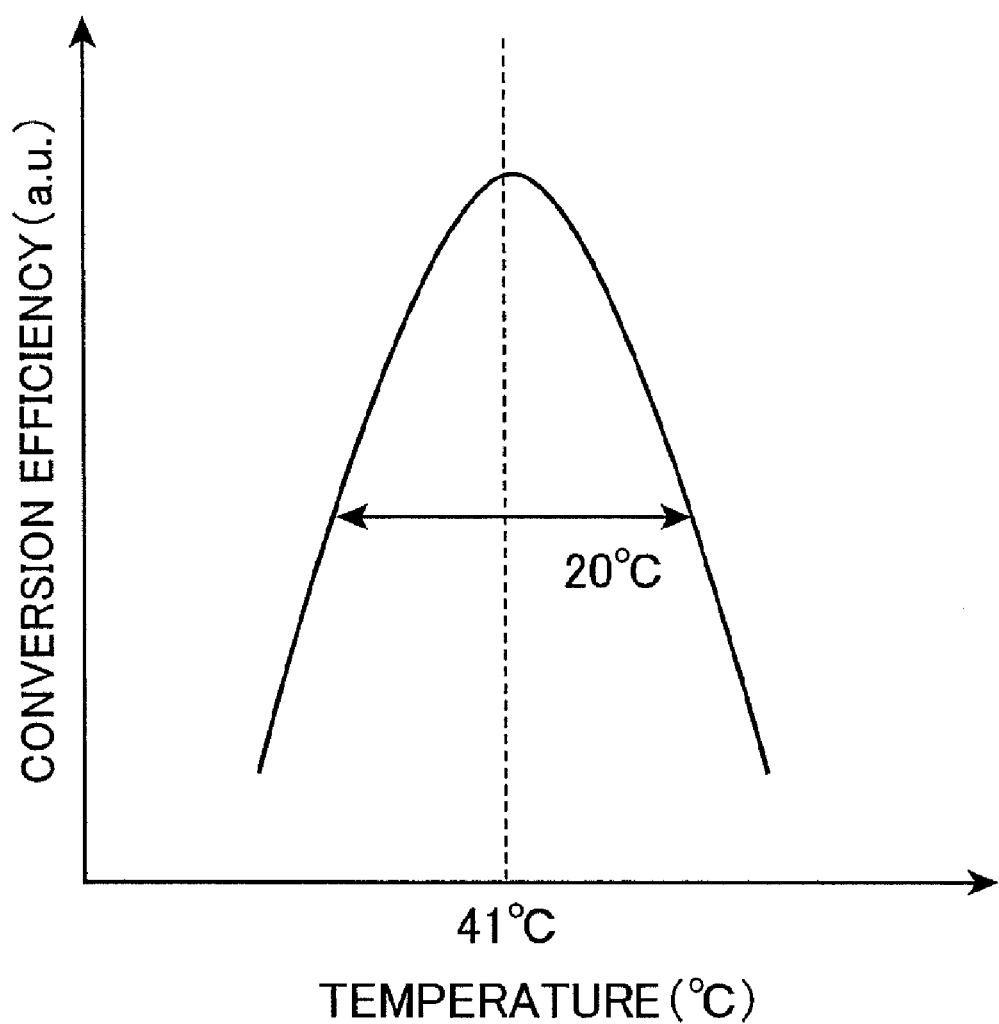
FIG. 2 is a graph showing a change of conversion efficiency according to a change in temperature of a wavelength conversion element.

FIG. 2 shows a characteristic of the wavelength conversion element 7 of the present embodiment. In FIG. 2, a horizontal axis represents the temperature of the wavelength conversion element 7 and a vertical axis represents conversion efficiency from the fundamental wave 13 into the second harmonic 14. As can be understood from FIG. 2, the conversion efficiency of the wavelength conversion element 7 varies according to a change in temperature of the wavelength conversion element 7. As shown in FIG. 1, the wavelength conversion element 7 of the present embodiment is accurately fabricated by being designed such that the conversion efficiency is maximized at 41° C. when the fundamental wave 13 is perpendicularly incident on the wavelength conversion element 7. In other words, a phase matching temperature of the wavelength conversion element 7 is 41° C. However, if the temperature of the wavelength conversion element 7 increases or decreases, the conversion efficiency from the fundamental wave 13 into the second harmonic 14 decreases. Its half width is about 20° C. A reduction in the conversion efficiency is caused by a change in the poling period of the wavelength conversion element 7 due to a change in refractive index in addition to thermal expansion or shrinkage of the wavelength conversion element 7 resulting from a change in temperature. If the poling period changes, the phase matching wavelength, at which the wavelength conversion is maximized, changes. The length of the wavelength conversion element 7 may be shortened to increase the half width, but an excessive shortening of the element is not preferable since it causes a reduction in the conversion efficiency.

In view of the above, the length of the wavelength conversion element 7 may be about 0.3 to 2 mm. If the element length is equal to or longer than 2 mm, a wavelength range of the wavelength convertible fundamental wave 13 is narrowed, which makes the use difficult and, simultaneously, increases a deviation of an optical path of the fundamental wave 13 in the case of rotating the wavelength conversion element 7 as described later. On the other hand, if the element length is equal to or shorter than 0.3 mm, the conversion efficiency from the fundamental wave 13 into the second harmonic 14 becomes too low. In the case of keeping the fundamental wave 13 perpendicularly incident on the wavelength conversion element 7, a temperature control using a Peltier element or the like as in the prior art is necessary. The use of the Peltier element leads to problems of higher cost, higher power consumption and higher heat generation as described above.

Figure 3A:
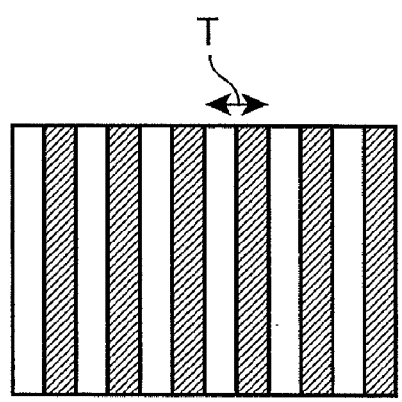
FIGS. 3A and 3B are diagrams showing a change of a phase matching condition according to the rotation of the wavelength conversion element.
Figure 3B:
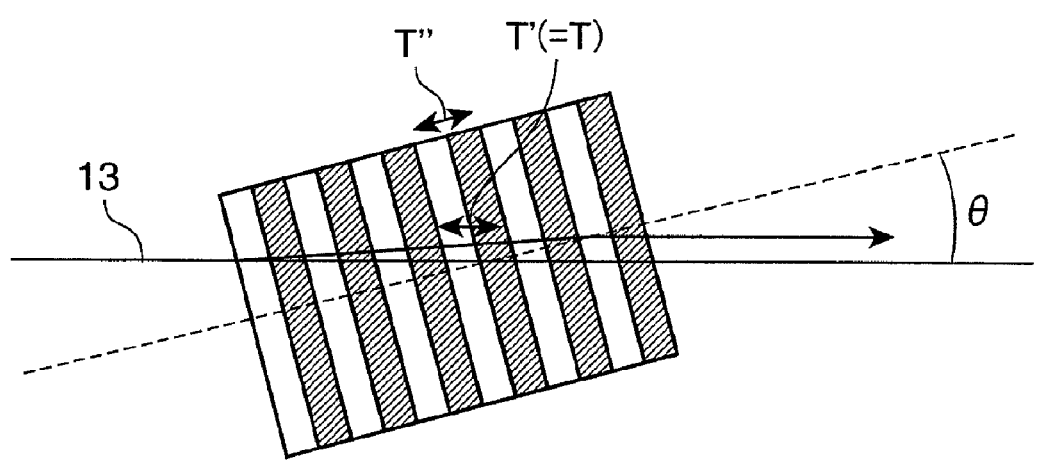
Figure 4:
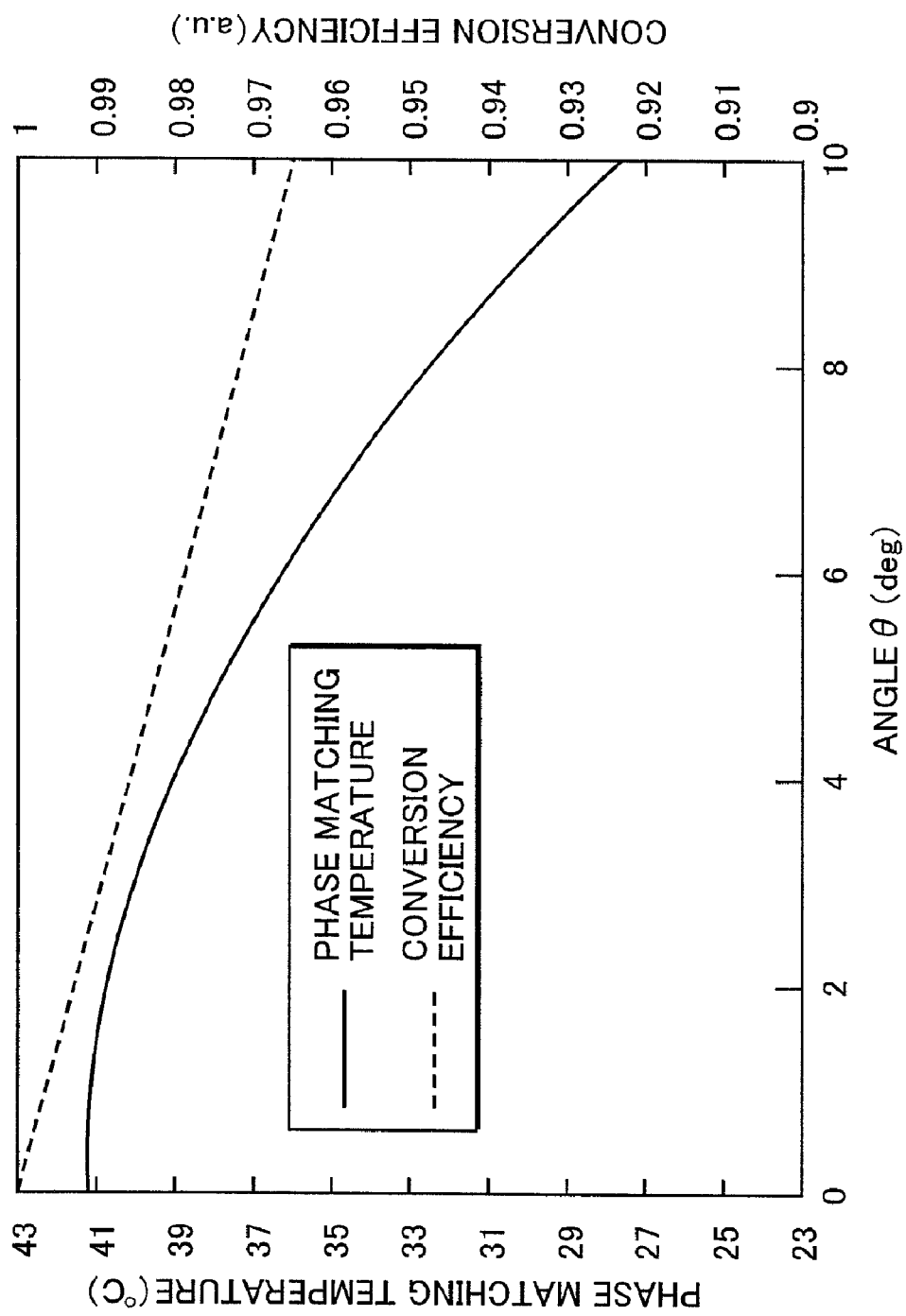
FIG. 4 is a graph showing a relationship of a rotation angle of the wavelength conversion element and a phase matching temperature.

Accordingly, in the internal resonator type SHG light source according to the present embodiment, the wavelength conversion element 7 is rotated to prevent an output variation resulting from the above temperature change of the wavelength conversion element 7 without providing a temperature control by a Peltier element. This point is described in detail below. FIGS. 3A, 3B and 4 are diagrams and a graph showing a change in the phase matching wavelength of the wavelength conversion element 7, wherein FIGS. 3A and 3B show a transmission state of the fundamental wave 13 when the wavelength conversion element 7 is rotated and FIG. 4 shows a relationship between a rotation angle (angle θ of FIG. 3B) of the wavelength conversion element 7 of the present embodiment and a temperature (phase matching temperature) at which phase matching is maximized.

As can be understood from FIG. 4, the phase matching temperature changes when the wavelength conversion element 7 is rotated. Further, upon rotating the wavelength conversion element 7, the conversion efficiency of the wavelength conversion element 7 is understood to be reduced. A reduction of the conversion efficiency is caused by a phenomenon called a wall-off in which propagation directions of the fundamental wave 13 and the second harmonic 14 are displaced in the wavelength conversion element 7.

However, since a reduction in the conversion efficiency when the wavelength conversion element 7 is rotated is small, it is possible to reduce a reduction in output of the second harmonic 14 from the light source. For example, in FIG. 4, the phase matching temperature largely changes from 41° C. to 27.5° in the case of changing a rotation angle θ of the wavelength conversion element 7 from 0° to 10°, whereas the reduction of the conversion efficiency is at most around 5%. The reduction of the conversion efficiency caused by the above walk-off has a larger influence in the case of adopting the wavelength conversion element 7 of a long length. It is therefore preferable also in view of the foregoing to adopt the wavelength conversion element 7 having a length of 2 mm or shorter.

FIG. 3A shows a rotational state of the wavelength conversion element 7 when the temperature of the wavelength conversion element 7 is 41° C. From FIG. 4, the temperature of the wavelength conversion element is 41° C. Thus, the rotation angle θ of the wavelength conversion element 7 is set to 0° in order to set the phase matching temperature to 41° C. In other words, the fundamental wave 13 is perpendicularly incident on the wavelength conversion element 7. On the other hand, FIG. 3B shows a rotational state of the wavelength conversion element 7 when the temperature of the wavelength conversion element 7 is 30° C. Since the temperature of the wavelength conversion element 7 is 30°, the rotation angle θ of the wavelength conversion element 7 is set to 9° in order to set the phase matching temperature to 30° C. The poling period of the wavelength conversion element 7 with respect to the fundamental wave 13 is T in the case of FIG. 3A, whereas an actual poling period is T'' (T''<T) in the case of FIG. 3B since the temperature of the wavelength conversion element 7 is lower than that in the case of FIG. 3A. However, as shown in FIG. 3B, when rotating the wavelength conversion element 7, the fundamental wave 13 passes at an inclined angle with respect to the polarization reversal region. As a result, the poling period with respect to the fundamental wave 13 is T'=T, and the conversion efficiency hardly decreases as compared with the case of FIG. 3A.

Next, a method for driving the internal resonator type SHG light source of FIG. 1 is described with reference to FIG. 4. Firstly, the temperature of the wavelength conversion element 7 is detected by the wavelength conversion element temperature detector 11. Subsequently, based on a detection signal, an optimal rotation angle is determined in the integrated circuit 16. The wavelength conversion element rotating mechanism 10 rotates based on a signal from the integrated circuit 16, which in turn rotates the wavelength conversion element 7. As a result, it is possible to prevent a drastic reduction in the conversion efficiency even when a change in temperature occurs. In the present embodiment, an electromagnetic actuator is used as the wavelength conversion element rotating mechanism 10. The electromagnetic actuator can be realized at low cost as used in an optical pickup. With the electromagnetic actuator, a time required for rotating the wavelength conversion element is short. Other than the electromagnetic actuator, a motor or the like may be used for the wavelength conversion element rotating mechanism 10.

Figure 5:
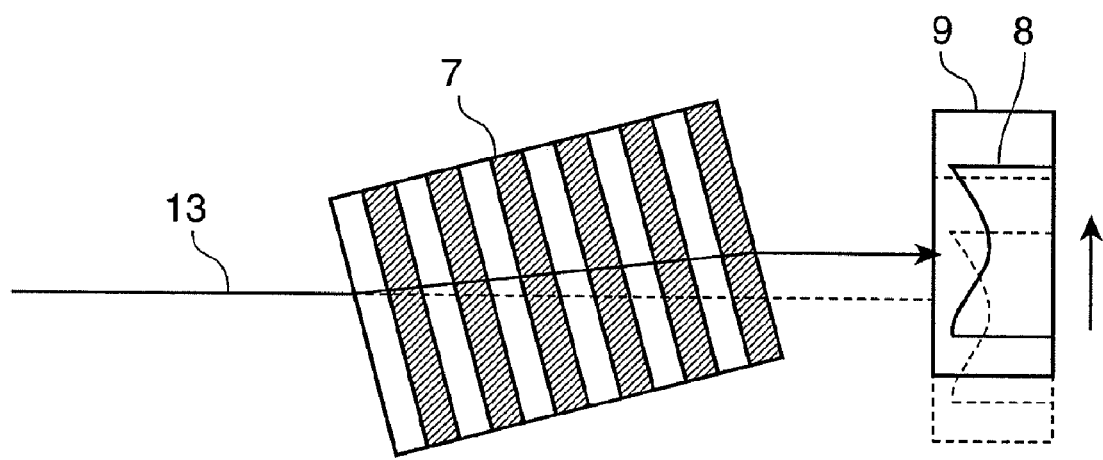
FIG. 5 is a diagram showing a movement of a concave mirror.

Next, a method for preventing a reduction in the oscillation efficiency of the fundamental wave caused upon rotating the wavelength conversion element 7 is described with reference to FIG. 5. In the case of rotating the wavelength conversion element 7 in response to a change in temperature as described above, an optical path of the fundamental wave 13 passing through the wavelength conversion element 7 changes from a dotted-line position to a solid-line position as shown in FIG. 5. Dotted line in FIG. 5 indicates an optical path in the case where the fundamental wave 13 is perpendicularly incident on the wavelength conversion element 7. If the optical path changes, a resonant state of the fundamental wave 13 changes accordingly, thereby leading to a reduction in the oscillation efficiency of the fundamental wave 13. Thus, in the present embodiment, the position of the concave mirror is moved using the concave mirror moving mechanism 9 to prevent a change in the resonant state. A necessary amount of movement of the concave mirror is calculated by the integrated circuit 16 based on the rotation angle of the wavelength conversion element 7. In the present embodiment, the concave mirror moving mechanism 9 is realized using a motor and a mechanism which slides by the rotation of the motor.

In addition, in order to stabilize the output of the second harmonic 14 outputted from the internal resonator type SHG light source 1, a part of the second harmonic 14 is split by the beam splitter 19 (see FIG. 1) to be incident on the light receiving element 18. The light incident on the light receiving element 18 is compared with a set value in the control circuit 16 to control a supply current to the pump semiconductor laser 2 for stabilizing the output. The rotating speed of the fan 17 is also controlled in the control circuit 16 to prevent a temperature increase of the internal resonator type SHG light source 1.

The output of the second harmonic 14 is stabilized without using any Peltier element by the above process.

As described above, according to the present embodiment, a considerable output reduction caused by a change in temperature of the wavelength conversion element is prevented and low power consumption is realized by eliminating the need for a temperature control by a Peltier element.

Second Embodiment

Figure 6:
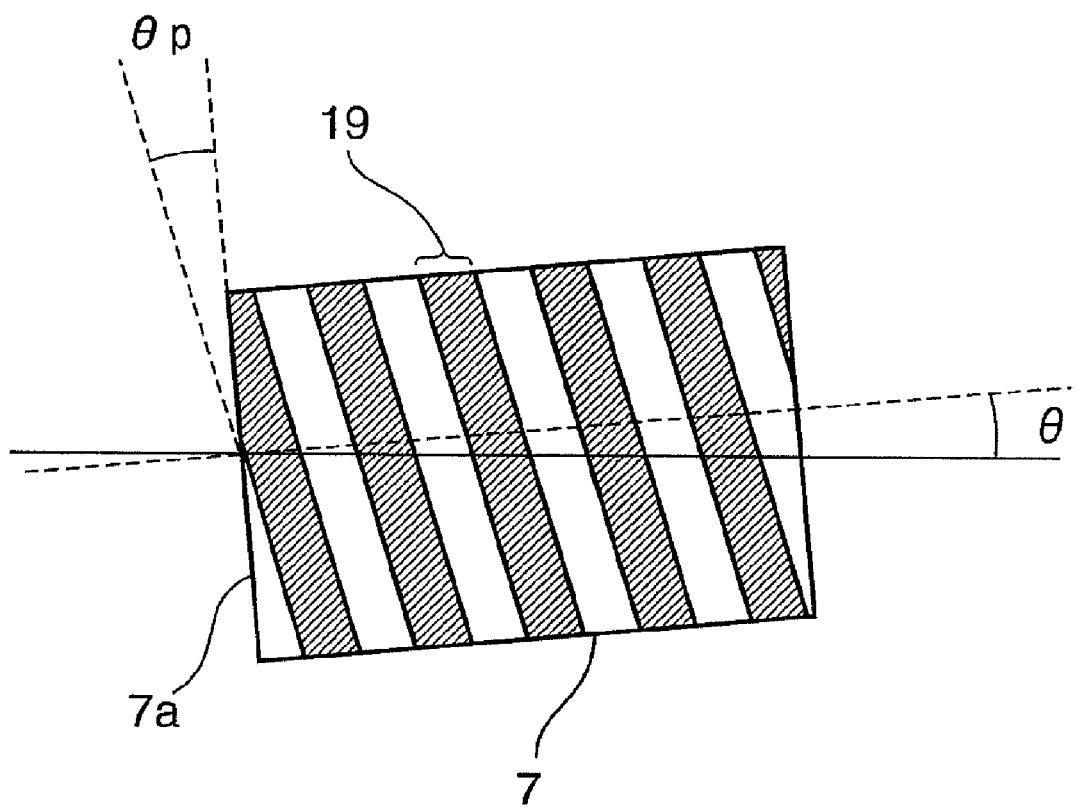
FIG. 6 is a diagram showing the structure of a wavelength conversion element used in an internal resonator type SHG light source according one embodiment of the present invention.

Next, the second embodiment of the present invention is described. A method for reducing the rotation of the wavelength conversion element 7 in the method described in the first embodiment for controlling the internal resonator type SHG light source to deal with a change in temperature is described in the present embodiment. Basic structure and control method are similar to those of the first embodiment. In the present embodiment, a wavelength conversion element 7 having a structure shown in FIG. 6 is used. The wavelength conversion element 7 of the present embodiment is arranged such that a polarization reversal region 19 formed therein is inclined with respect to an incident surface 7a (at an inclination angle θp in FIG. 6). According to the foregoing structure wherein the polarization reversal region 19 is inclined, it is possible to reduce a range of the rotation angle of the wavelength conversion element 7 to be adjusted in response to a change in temperature.

Figure 7:
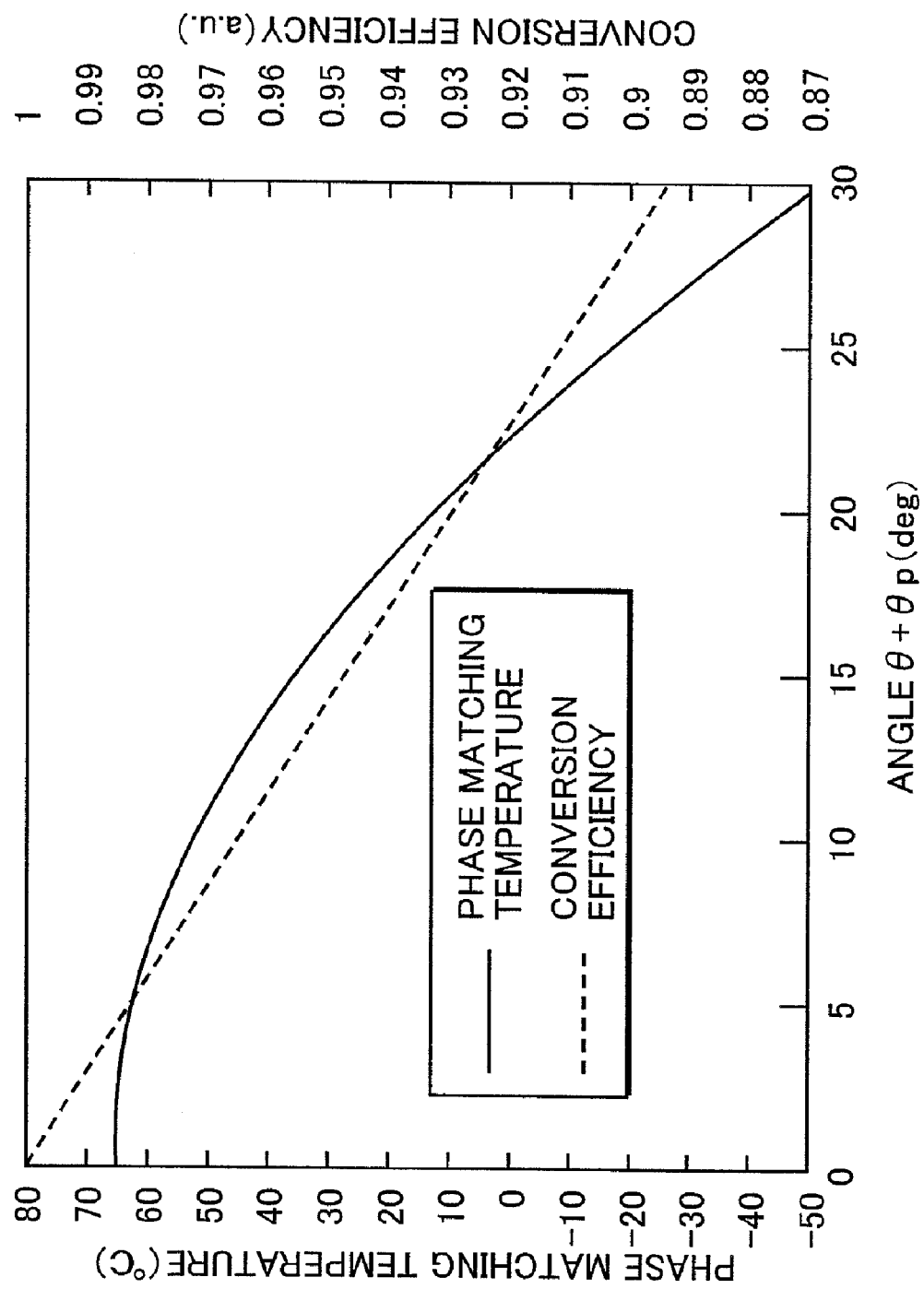
FIG. 7 is a graph showing a relationship of the sum of a rotation angle of the wavelength conversion element and an inclination angle of a polarization reversal region and a phase matching temperature.

The characteristic shown in FIG. 4 is the one when the polarization reversal region is at right angles to the incident light (when θp=0 in FIG. 6). When the rotation angle θ is small (θ=0 to 2°), a change of the phase matching temperature upon changing the rotation angle is understood to be small. On the other hand, if the rotation angle is 2° or larger, a change of the phase matching temperature per degree of the angle increases. In view of the foregoing characteristic feature, the wavelength conversion element 7 in accordance with the present embodiment was designed such that the incident surface of the wavelength conversion element 7 and the polarization reversal region 19 forms an angle θp of 2° or larger, and is inserted beforehand into the resonator. FIG. 7 shows characteristics of the wavelength conversion element 7 of the present embodiment. In the graph of FIG. 7, a horizontal axis indicates the sum of the rotation angle θ of the wavelength conversion element 7 and the angle θp between the incident surface and the polarization reversal region 19. The period of the polarization reversal region 19 is set to be shorter than that of the first embodiment. Specifically, the poling period of the present embodiment is set to 6.91 μm while the poling period of the first embodiment is set to 6.95 μm. Further, θp is set to 10° in the present embodiment. According to the structure of the present embodiment, θ+θp is 10° or larger. It is therefore possible to increase an amount of change in the phase matching temperature per degree, and to reduce a required amount of rotation (the rotation angle θ) of the wavelength conversion element 7 in response to a change in temperature.

The inclination angle is preferably set in a range of from 2° to 30°. As can be understood from FIG. 7, conversion efficiency from the fundamental wave 13 into the second harmonic wave 14 is reduced as θp is increased. If θp is set to 30° or larger, the wavelength conversion efficiency decreases by 10% or lower and the output of the pump semiconductor laser 2 needs to be increased in order to compensate for the reduction in the output of the second harmonic 14. This is not preferable since a burden on the pump semiconductor laser 2 increases.

By using the wavelength conversion element 7 with θp set to 2° or larger as described above, it is possible to reduce a required range for the rotation angle θ to be adjusted in response to a change in temperature. In the meantime, it is possible to reduce a displacement in the optical path caused when the fundamental wave 13 passes through the wavelength conversion element 7 by reducing the required range for the adjustment of the rotation angle θ, which in turn reduces a required moving range of the concave mirror 8. Furthermore, in the case of adopting the wavelength conversion element 7 with a length of 0.5 mm or shorter, a displacement in the optical path can be reduced to be very small. As a result, the positional adjustment of the concave mirror 8 when rotating the wavelength conversion element 7 may be omitted.

Third Embodiment

Figure 8:
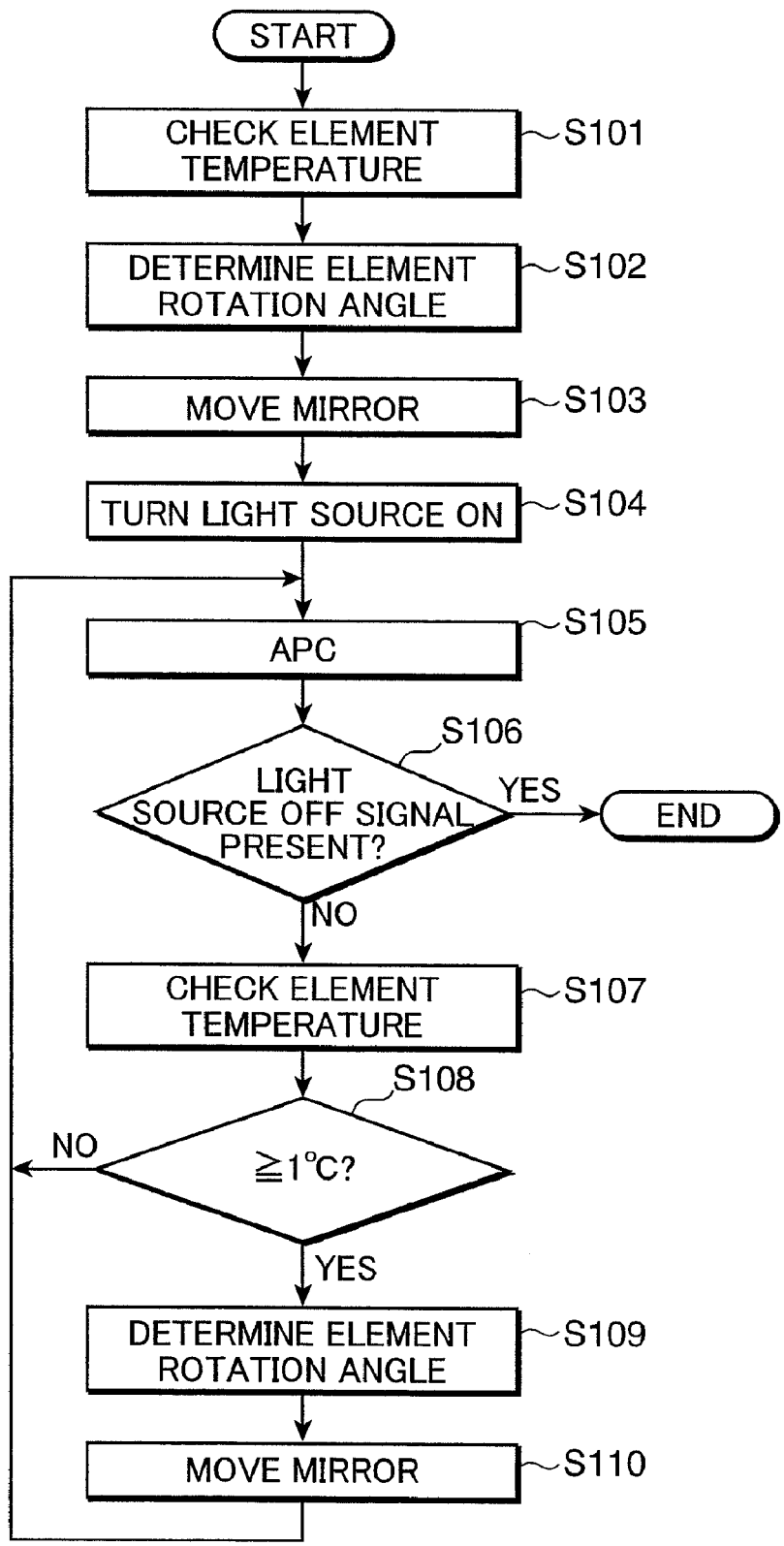
FIG. 8 is a flow chart showing processes of a driving method of an internal resonator type SHG light source according to a third embodiment of the present invention.
Figure 9:
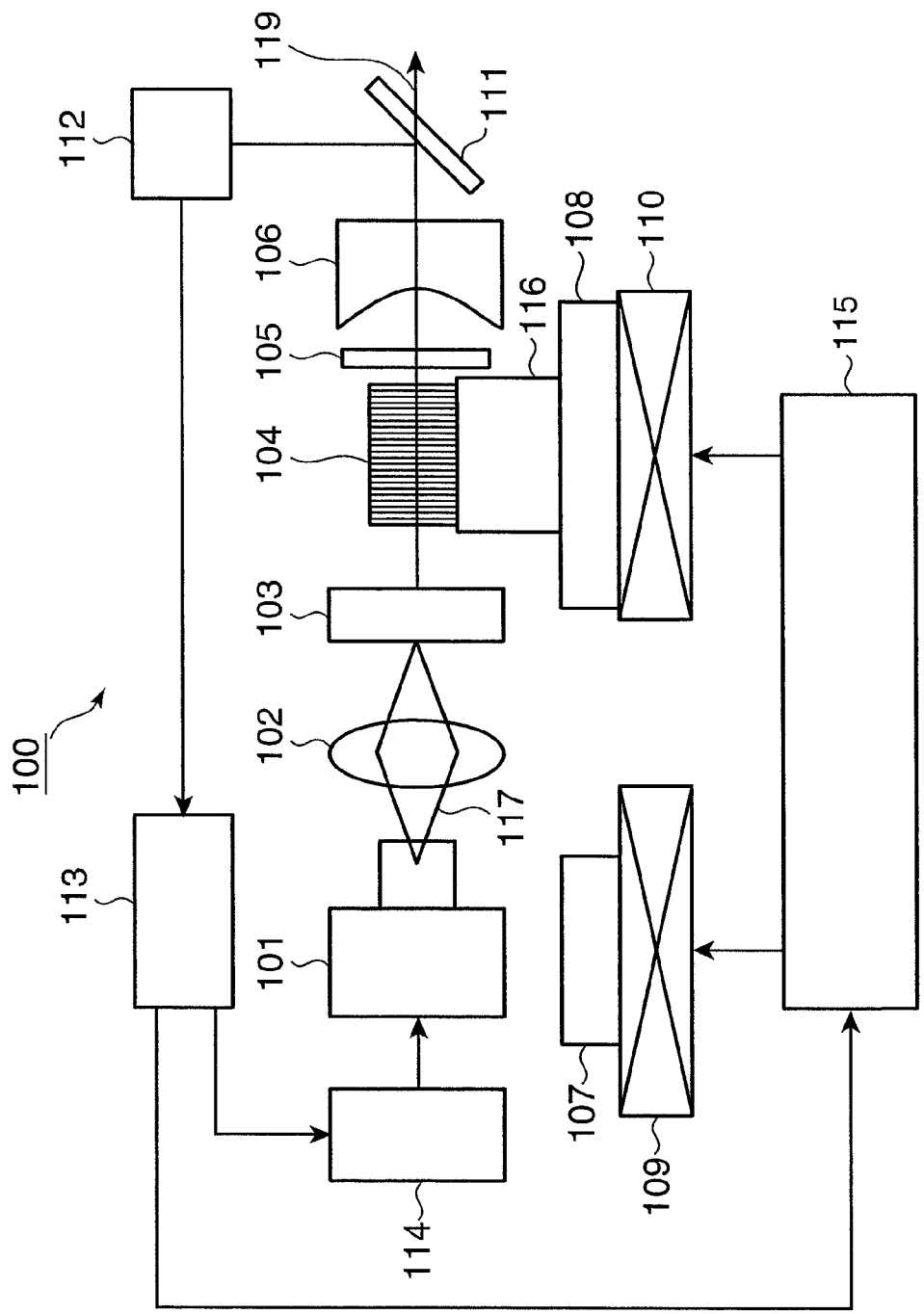
FIG. 9 is a schematic diagram showing the structure of a conventional internal resonator type SHG light source.

Next, the third embodiment of the present invention is described. The present embodiment relates to processes of a method for driving the internal resonator type SHG light sources according to the first and second embodiments. FIG. 8 is a flow chart showing the processes of the method for driving the internal resonator type SHG light source according to the present embodiment.

As shown in FIG. 8, a detection signal is first outputted from the wavelength conversion element temperature detector 11 to the integrated circuit 16 before starting the driving of the light source, and the control circuit 161 checks the temperature of the wavelength conversion element 7 based on the detection signal in the integrated circuit 16 (Step S101).

Next, the control circuit 161 determines the rotation angle θ of the wavelength conversion element 7 by referring to data stored in the memory circuit 162 beforehand (Step S102). Data indicative of the relationship between the rotation angle of the wavelength conversion element 7 and the phase matching temperature shown in FIGS. 4 and 7 are stored beforehand in the memory circuit 162, and the control circuit 161 determines the rotation angle of the wavelength conversion element 7 such that the temperature of the wavelength conversion element 7 as checked in Step S101 coincides with the phase matching temperature of the wavelength conversion element 7. For example, if ambient temperature is normal temperature (27° C.), the temperature of the wavelength conversion element 7 is assumed to be 27° C. before driving the light source. Specifically, in the case of the wavelength conversion element 7 of the first embodiment, the control circuit 161 refers to the data in the memory circuit 162 and sets the rotation angle θ of the wavelength conversion element 7 to, for example, 12° (see FIG. 4). Alternatively, in the case of the wavelength conversion element 7 of the present embodiment, the rotation angle θ+θp of the wavelength conversion element 7 is set to, for example, 18°. The control circuit 161 then informs the wavelength conversion element rotating mechanism 10 of the rotation angle as set and the wavelength conversion element rotating mechanism 10 rotates the wavelength conversion element 7 based on the rotation angle as received.

Subsequently, the control circuit 161 determines an amount of movement of the concave mirror 8 corresponding to the rotation angle of the wavelength conversion element 7 as set in Step S102 (Step S103). Data indicative of the amount of movement of the concave mirror 8 corresponding to the rotation angle of the wavelength conversion element 7 are stored in the memory circuit 162 beforehand, and the control circuit 161 can determine the amount of movement of the concave mirror 8 by referring to the data stored in the memory circuit 162. The control circuit 161 informs the concave mirror moving mechanism 9 of the amount of movement of the concave mirror 8 as determined. In response, the concave mirror moving mechanism 9 moves the concave mirror 8 based on the amount of movement as received from the control circuit 161.

Next, in response to an instruction to turn on the light source given by a user, the driving device 15 starts driving the light source (Step S104). The driving device then applies a drive current to the pump semiconductor laser 2 to cause the pump semiconductor laser 2 to start emitting pump light 12, in the meantime, monitors an output of a part of the second harmonic 14 reflected by the beam splitter 19 using the light receiving element 18 and adjusts the drive current of the pump semiconductor laser 2 based on the monitoring result so that the output of the second harmonic 14 has a desired intensity. By doing so, the intensity of the pump light 12 from the pump semiconductor laser 2 is adjusted, which in turn adjust the output intensity of the fundamental wave 13 in the resonator. As a result, it is possible to perform a so-called automatic power control (hereinafter, abbreviated as an "APC") of keeping the intensity of the output of the internal resonator type SHG light source 1 under stable conditions (Step S105).

Subsequently, the driving device 15 performs the APC of Step S105, and the temperature of the wavelength conversion element 7 is checked at specified time intervals as in Step S101 (Step S107) until a light source OFF signal is given by the user (Step S106). If the light source OFF signal is given in Step S106, the driving device 15 stops driving the internal resonator type SHG light source 1.

Next, the control circuit 161 judges whether the temperature of the wavelength conversion element 7 as checked in Step S107 is higher by a specified degree (e.g. by 1° C.) than the previously checked temperature (Step S108) and continues the APC in Step S105 if the temperature has not increased to the temperature specified degree (e.g. by 1° C.) higher than the previously checked temperature (NO in Step S108). On the other hand, if the temperature has increased to the above level (YES in Step S108), the rotation angle of the wavelength conversion element 7 is determined based on the temperature of the wavelength conversion element 7 as checked in Step S107 (Step S109) and an amount of movement of the concave mirror 8 is determined based on the rotation angle of the wavelength conversion element 7 as determined in Step S109.

In this way, Steps S105 to S110 are repeated unless the light source OFF signal is given in Step S106.

In the present embodiment, the concave mirror 8 is moved in Steps S103 and S110. However, the present embodiment is not intended to be limited to this structure. For example, in the case where the positional adjustment of the concave mirror 8 upon rotating the wavelength conversion element 7 is not needed as described in the second embodiment, the movements of the concave mirror 8 in Steps S103 and S110 can be omitted.

The present invention is summarized as below from the above respective embodiments. Specifically, an internal resonator type SHG light source according to one aspect of the present invention includes a pump light source which emits a pump light; a solid-state laser which absorbs the pump light and which emits a fundamental wave; an output mirror provided so as to face the solid-state laser, which forms a resonator together with the solid-state laser; a wavelength conversion element provided in the resonator, which converts the fundamental wave into a harmonic wave; a detector which detects a temperature of the wavelength conversion element; and a rotating unit which changes an incident angle of the fundamental wave on the wavelength conversion element by rotating the wavelength conversion element, wherein the rotating unit rotates the wavelength conversion element according to the temperature of the wavelength conversion element as detected by the detector.

According to the foregoing internal resonator type SHG light source, the incident angle of the fundamental wave on the wavelength conversion element is changed by rotating the wavelength conversion element according to the temperature of the wavelength conversion element. Thus, a variation of a phase matching condition resulting from a change in temperature of the wavelength conversion element can be suppressed by the rotation of the wavelength conversion element. Accordingly, a temperature control of the wavelength conversion element is unnecessary and low power consumption, low cost and miniaturization of the device can be realized.

With the foregoing structure, it is preferable to further include a moving unit which moves the output mirror according to a rotation angle of the wavelength conversion element to be rotated by the rotating unit such that an optical axis of the fundamental wave emitted from the wavelength conversion element toward the output mirror substantially coincides with an optical axis of the output mirror.

According to the foregoing structure, even when rotating the wavelength conversion element, it is possible to make the optical axis of the fundamental wave substantially coincide with the optical axis of the output mirror. It is therefore possible to stabilize the oscillation state of the fundamental wave within the resonator.

With the foregoing structure, it is preferable to further include: a memory which stores therein rotation angle data indicative of a correspondence relationship between the phase matching temperature of the wavelength conversion element and the rotation angle of the wavelength conversion element, wherein the rotating unit includes a rotating mechanism for rotating the wavelength conversion element based on the temperature of the wavelength conversion element as detected by the detector and a controller for controlling the rotation of the wavelength conversion element by the rotating mechanism; and the controller controls the rotation of the wavelength conversion element by referring to the rotation angle data stored in the memory such that the temperature of the wavelength conversion element detected by the detector substantially coincides with the phase matching temperature of the wavelength conversion element.

According to the foregoing structure, by referring to the rotation angle data indicative of the correspondence relationship between the phase matching temperature of the wavelength conversion element and the rotation angle of the wavelength conversion element, it is possible to more control the rotation of the wavelength conversion element with an improved precision.

With the foregoing structure, it is preferable that the moving unit includes a moving mechanism for moving the output mirror based on the rotation angle of the wavelength conversion element to be rotated by the rotating unit; the controller further controls the moving mechanism which moves the output mirror; the memory further stores therein movement amount data indicative of a correspondence relationship between the rotation angle of the wavelength conversion element and the movement amount of the output mirror, where the optical axis of the fundamental wave emitted from the wavelength conversion element toward the output mirror substantially coincides with the optical axis of the output mirror; and the controller controls a movement of the output mirror by referring to the movement amount data stored in the memory such that the optical axis of the fundamental wave emitted from the wavelength conversion element toward the output mirror substantially coincides with the optical axis of the output mirror.

According to the foregoing structure, by referring to the movement amount data stored in the memory, indicative of the correspondence relationship between the rotation angle of the wavelength conversion element and the movement amount of the output mirror, it is possible to control movement of the output mirror with an improved precision.

With the foregoing structure, it is preferable that the controller and the memory are incorporated in an integrated circuit.

According to the foregoing structure, the controller and the memory are formed in the same integrated circuit. It is therefore possible to realize a high speed communication between the controller and the memory and to reduce the size of the controller and the memory.

With the foregoing structure, it is preferable that the wavelength conversion element have a length in a range of from 0.3 mm to 2 mm.

According to the foregoing structure, it is possible to reduce a displacement of the optical path of the fundamental wave caused by the rotation of the wavelength conversion element without reducing the wavelength range of the fundamental wave subjected to the wavelength conversion.

With this structure, it is preferable that a polarization reversal region formed in the wavelength conversion element forms a predetermined inclination angle with respect to an end surface of the wavelength conversion element on the side of the solid-state laser.

According to the foregoing structure, it is possible to reduce the rotation angle of the wavelength conversion element in response to a change in temperature of the wavelength conversion element. It is therefore possible to reduce an amount of displacement of the optical path of the fundamental wave caused by the rotation of the wavelength conversion element.

With the foregoing structure, it is preferable that the predetermined inclination angle be set in a range of from 2° to 30°.

According to the foregoing structure, it is possible to reduce the range of the rotation angle to be adjusted according to a change in temperature of the wavelength conversion element without reducing the conversion efficiency from the fundamental wave into the second harmonic wave.

With the foregoing structure, it is preferable that the wavelength conversion element be made of Mg-doped lithium niobate crystal.

According to the foregoing structure, it is possible to improve the conversion efficiency from the fundamental wave into the second harmonic while reducing the length of the wavelength conversion element.

INDUSTRIAL APPLICABILITY

The present invention realizes an internal resonator type SHG light source, which does not require a temperature control by a Peltier element, and is suited for a light source device of low power consumption, low cost and smaller size.

What is claimed is:

1. An internal resonator type SHG light source, comprising: a pump light source which emits a pump light; a solid-state laser which absorbs the pump light and which emits a fundamental wave; an output mirror provided so as to face the solid-state laser, which forms a resonator together with the solid-state laser; a wavelength conversion element provided in said resonator, which converts the fundamental wave into a harmonic wave; a detector which detects a temperature of said wavelength conversion element; and a rotating unit which changes an incident angle of the fundamental wave on said wavelength conversion element by rotating said wavelength conversion element, wherein said rotating unit rotates said wavelength conversion element according to the temperature of said wavelength conversion element as detected by the detector; wherein the wavelength conversion element is made of Mg-doped lithium niobate crystal; wherein a polarization reversal region formed in said wavelength conversion element forms a predetermined inclination angle with respect to an end surface of the wavelength conversion element on the side of the solid-state laser; wherein the predetermined inclination angle is in a range of from 2° to 30°; wherein said wavelength conversion element has a length in a range of from 0.3 mm to 2 mm.

2. An internal resonator type SHG light source according to claim 1, further comprising:
a moving unit which moves the output mirror according to a rotation angle of the wavelength conversion element to be rotated by the rotating unit such that an optical axis of the fundamental wave emitted from said wavelength conversion element toward the output mirror substantially coincides with an optical axis of the output mirror.

3. An internal resonator type SHG light source according to claim 2, further comprising:
a memory which stores therein rotation angle data indicative of a correspondence relationship between the phase matching temperature of said wavelength conversion element and the rotation angle of said wavelength conversion element, wherein:
the rotating unit includes a rotating mechanism for rotating the wavelength conversion element based on the temperature of the wavelength conversion element as detected by the detector and a controller for controlling the rotation of the wavelength conversion element by the rotating mechanism; and
the controller controls the rotation of the wavelength conversion element by referring to the rotation angle data stored in the memory such that the temperature of the wavelength conversion element detected by the detector substantially coincides with the phase matching temperature of said wavelength conversion element.

4. An internal resonator type SHG light source according to claim 3, wherein:
the moving unit includes a moving mechanism for moving the output mirror based on the rotation angle of said wavelength conversion element to be rotated by said rotating unit;
said controller further controls said moving mechanism which moves the output mirror;
the memory further stores therein movement amount data indicative of a correspondence relationship between the rotation angle of said wavelength conversion element and the movement amount of the output mirror, where the optical axis of the fundamental wave emitted from the wavelength conversion element toward the output mirror substantially coincides with the optical axis of the output mirror; and
the controller controls a movement of the output mirror by referring to the movement amount data stored in the memory such that the optical axis of the fundamental wave emitted from the wavelength conversion element toward the output mirror substantially coincides with the optical axis of the output mirror.

5. An internal resonator type SHG light source according to claim 3, wherein: said controller and the memory are incorporated in an integrated circuit.

* * * * *